United States Patent [19]

Sammut

[11] 4,175,680

[45] Nov. 27, 1979

[54] DISPENSING CONTAINERS

[76] Inventor: Nicholas Sammut, 220 Newbridge Rd., Moorebank, New South Wales, Australia, 2170

[21] Appl. No.: 913,603

[22] Filed: Jun. 8, 1978

[30] Foreign Application Priority Data

Jun. 9, 1977 [AU] Australia ............................. 0390/77

[51] Int. Cl.² ............................................. B65D 47/28
[52] U.S. Cl. ...................................... 222/465; 222/486
[58] Field of Search ............... 222/486, 485, 465, 565, 222/175; 239/652

[56] References Cited

U.S. PATENT DOCUMENTS

| 2,495,906 | 1/1950 | Porter | 222/465 X |
| 2,624,492 | 1/1953 | Seltzer | 222/486 X |

Primary Examiner—John P. Shannon

[57] ABSTRACT

A container for dispensing powdered or granulated material is provided. The container includes top, bottom, side, and end walls with the top of the container having a handle and a filling spout communicating with the interior of the container. The bottom of the container is provided with slide channels, the slide channels cooperating with a slide channel engaging mechanism on the closure member to secure the closure member to the bottom of the container. The closure member is movable from a closed position where the array of openings in the closure member are out of register with the array of openings in the bottom of the container to an open position where the array of openings in the closure member are in register with the array of openings in the bottom of the container for the purpose of dispensing the contents of the container.

2 Claims, 8 Drawing Figures

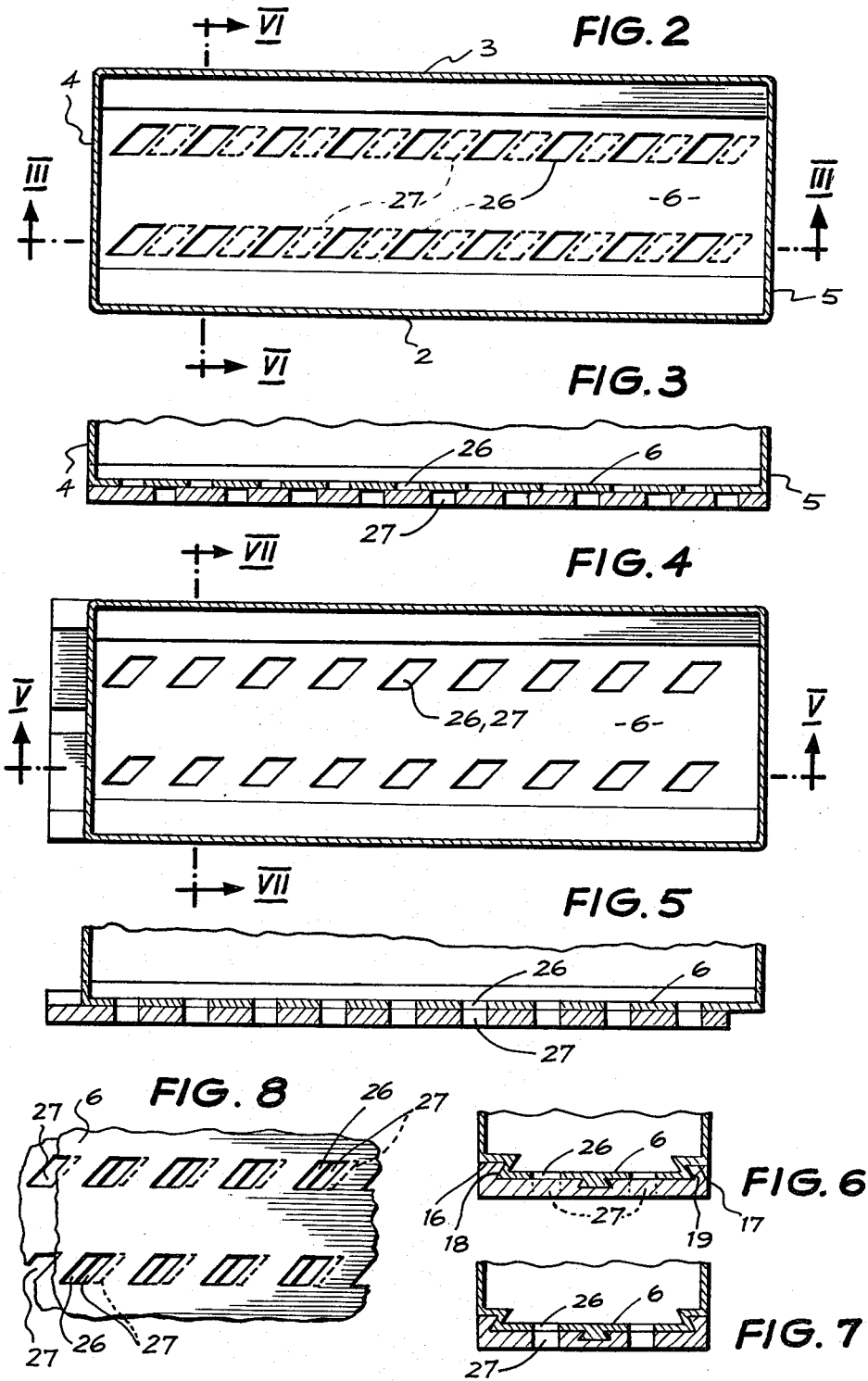

DISPENSING CONTAINERS

BACKGROUND OF THE INVENTION

This invention relates to improvements in and relating to dispensing containers and more particularly to dispensing containers for dispensing powdered or granulated material. While not limited thereto, the invention is particularly applicable to containers for holding and distributing fertilizers.

It has been customary in the past to pack powdered or granulated material, e.g. fertilizer in containers of flexible plastics material e.g. polystyrene or polyethylene. The container is sealed after filling by fusing the filling opening and the contents of the container are then dispensed by cutting an opening in the end of the container and permitting the contents to gravitate therefrom.

Containers of this type have not proved satisfactory as they are extremely flexible, they are difficult to handle and because they do not include any metering arrangement. It is not possible to evenly distribute the contents thereof.

There is accordingly a long felt need for a dispensing container made of inexpensive material which can be used to house powdered or granulate material, which is resealable and which can evenly distribute the contents thereof in a simple and efficient manner.

SUMMARY OF THE INVENTION

The invention in its broadest form comprises a container having a top and bottom and side and end walls, the top of the container having a handle and a filling spout communicating with the interior of the container, the bottom of the container having an array of openings therein, a closure member retained on the bottom of said container and having an array of openings therein, said closure member being movable from a closed position where the array of openings in the closure member are out of register with the array of openings in the bottom of the container to an open position where the array of openings in the closure member are in register with the array of openings in the bottom of the container for the purpose of dispensing the contents of the container.

BRIEF DESCRIPTION OF THE DRAWINGS

One embodiment of the invention will now be described with reference to the accompanying drawings in which:

FIG. 2 is a section on line II—II of FIG. 1 with the closure member or slide plate in register with the container bottom;

FIG. 3 is a section on line III—III of FIG. 2;

FIG. 4 is a section on line IV—IV of FIG. 1 with the closure member or slide plate out of register with the container bottom;

FIG. 5 is a section on line V—V of FIG. 4;

FIG. 6 is a section on line VI—VI of FIG. 2;

FIG. 7 is a section on line VII—VII of FIG. 4, and

FIG. 8 is a sectional view showing the openings 26 in the container bottom partially closed by the closure member or slide plate.

DETAILED DESCRIPTION OF THE INVENTION

Figure 1:
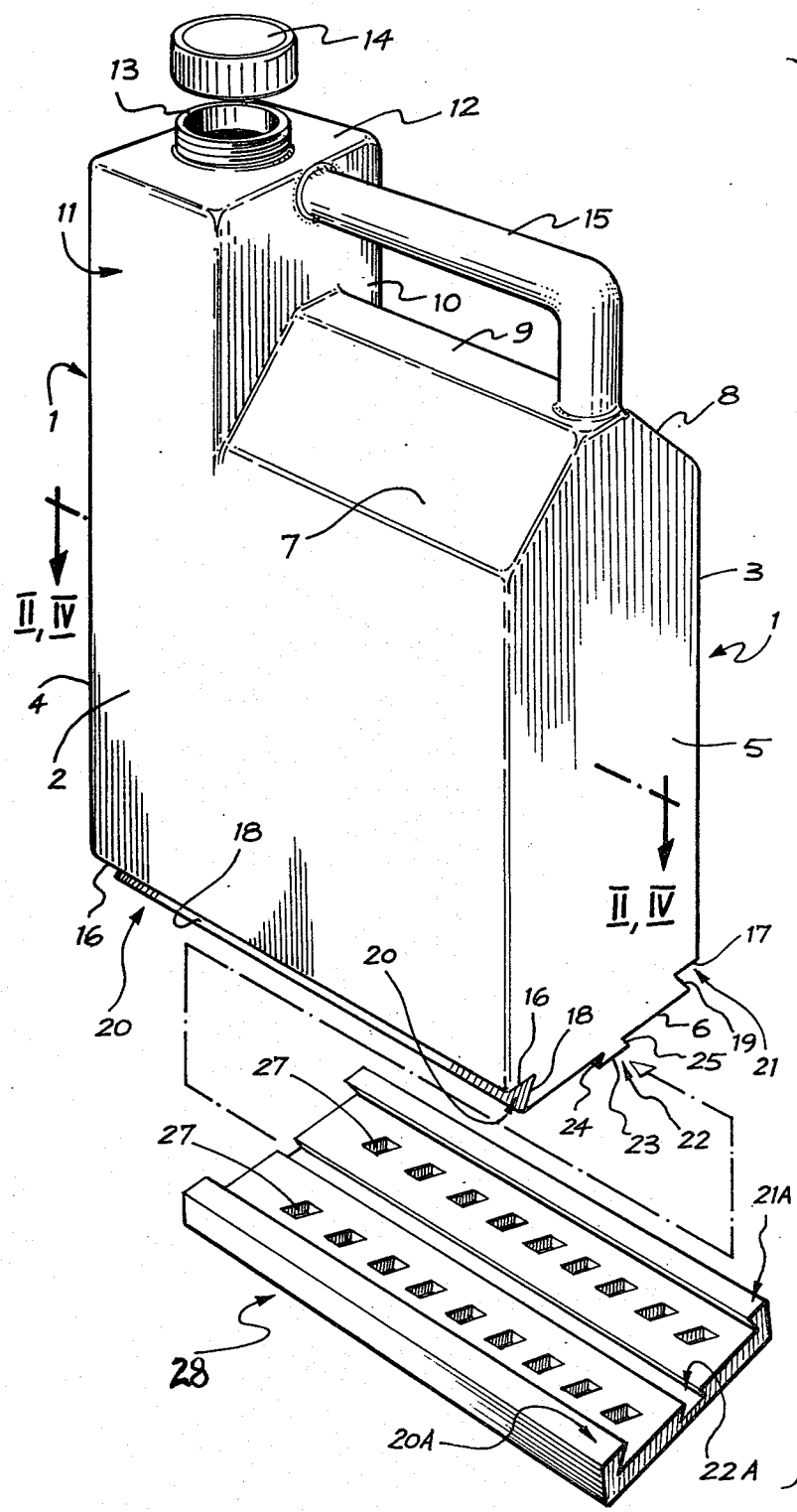
FIG. 1 is a perspective view of the container showing the closure member or slide plate detached therefrom.

The container designated generally by the reference 1 is rectangular in shape and has side walls 2 and 3, end walls 4 and 5 and a bottom 6. The side walls adjacent the top of the container and for a distance approximately three quarters across the width of the container converge inwardly and upwardly as at 7 and 8 and terminate in a flat top portion 9. The converging portions 7 and 8 terminate in an upstanding wall 10 spaced from the side wall 2 which forms a filling spout designated generally by the reference 11. The wall 10 merges into a top 12 which in turn merges into side wall 2. The top 12 is parallel with the bottom 6 and is provided with an opening surrounded by a threaded upstanding lip 13 which is closed by a removable filler cap 14. The wall 10 is provided with a handle portion 15 spaced from the top 9. The handle portion has a leg which merges into the top portion 9. The other end of the handle merges into the wall 10.

The bottom side walls 1 and 2 are turned inwardly forming the shoulders 16 and 17 adjacent the bottom 6. These shoulders extend inwardly a short distance parallel to the bottom 6 and the side walls are turned outwardly at an acute angle as at 18 and 19, and merge with the bottom 6 to form two slide channels, designated generally by the references 20, 21, located at each side of the container.

The bottom of the container is provided with a longitudinally extending protuberance designated generally by the reference 22. This protuberance has a flat portion 23 with acute angled sides 24 and 25 merging into the bottom 6. The protuberance extends across the container bottom from the end wall 4 to the end wall 5.

The container thus far described is conveniently formed of rigid or semi-rigid plastics material in a blow molding operation as is well understood in the art.

The bottom 6 is provided with two arrays of openings 26 adjacent each of the side walls 2 and 3. The openings are preferably rhomboid in shape.

The bottom of the container is provided with a closure member or slide plate designated generally by the reference 28. The plate 28 has portions 20A and 21A and a dovetailed shaped slide channel 22A respectively shaped complementary to the slide channels 19 and 20, and the protuberance 22 on the container bottom. The interengagement of the portions 20A and 21A and the slide channel 22A with the slide channels 19 and 20 and the protuberance 22 slidably secures the slide plate 28 to the container bottom.

The slide plate 28 is provided with two arrays of openings 27 shaped complementary to the openings 26 in the container bottom. The openings 27 are offset from the openings 26 so that when the slide plate is in its closed position as illustrated in FIGS. 2 and 3, the openings 27 are out of register with the openings 26 and so the bottom of the container is closed.

The slide plate may however be moved relative to the container bottom and thus bring the openings 27 into full register or partial register with the openings 26 as illustrated in FIGS. 4, 5 and 8 for the purpose of dispensing the contents of the container.

The slide plate is provided with a catch (not shown) which engages a detent (not shown) on the container bottom to normally retain the slide plate in the closed position.

Although the invention has been described with two arrays of openings in the container bottom and in the slide plate, it will be appreciated that a different arrangement of the openings may be found necessary both in number and shape to suit particular requirements. The slide plate is conveniently made of plastics material as is well understood in the art.

What is claimed is:

1. A container having a top and bottom and side and end walls, the top of the container having a handle and a filling spout communicating with the interior of the container, the bottom of the container having an array of openings therein, a closure member having an array of openings therein, the side walls of the container and the bottom of the container being provided with slide channels, said slide channels cooperating with slide channel engaging means on said closure member to secure the closure member to the bottom of the container, said closure member being movable from a closed position where the array of openings in the closure member are out of register with the array of openings in the bottom of the container to an open position where the array of openings in the closure member are in register with the array of openings in the bottom of the container for the purpose of dispensing the contents of the container.

2. A closure member as claimed in claim 1 wherein each opening in the array of openings in the bottom of the container and in the closure member is rhomboid in shape.

* * * * *